S. L. WORSLEY.
NUT-TAPPING MACHINE.

No. 195,321. Patented Sept. 18, 1877.

Attest.
Edgar Tate
J. H. Scarborough

Inventor.
S. L. Worsley
By Munn & Co.
Attorneys.

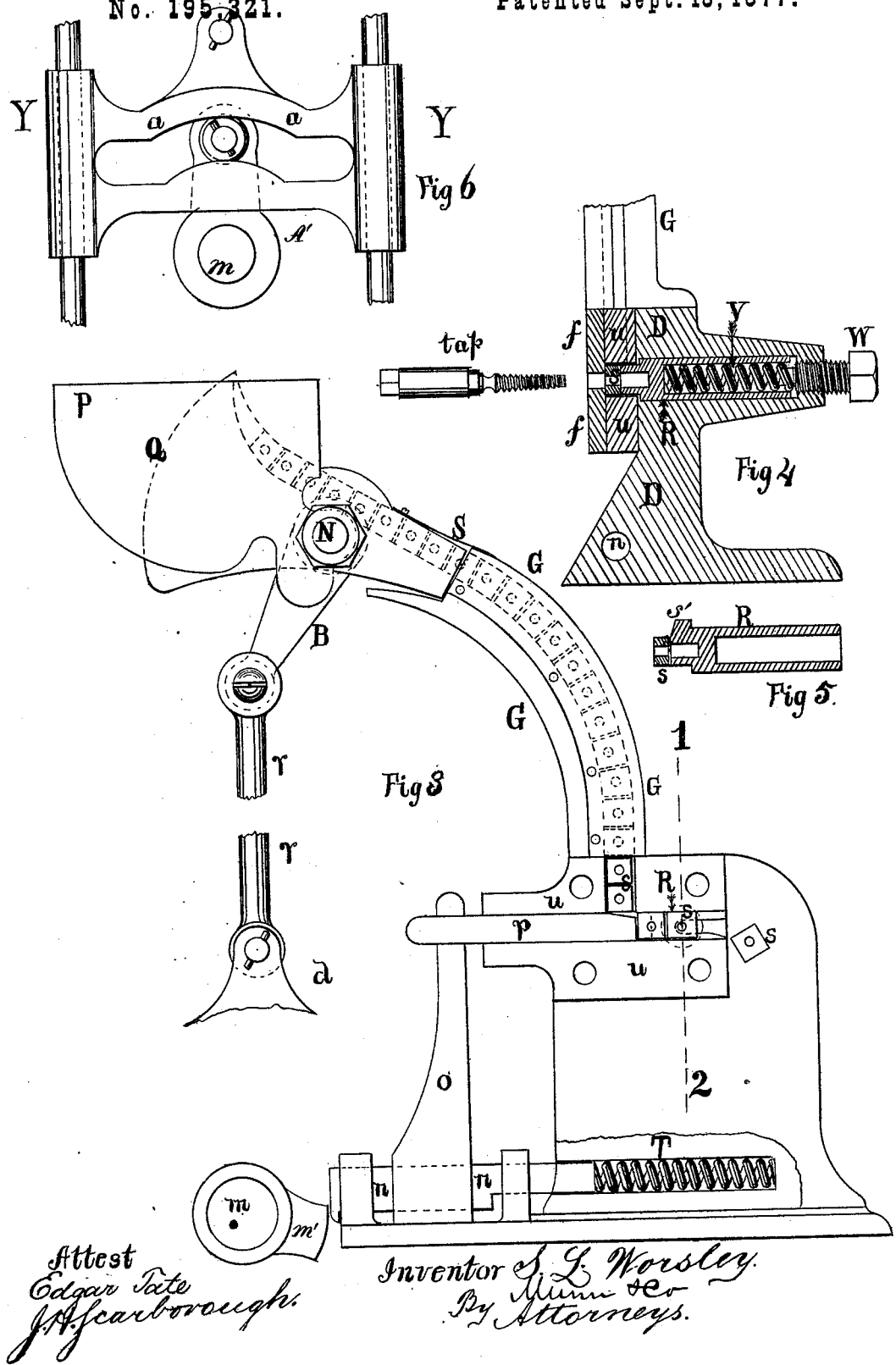

UNITED STATES PATENT OFFICE.

SAMUEL L. WORSLEY, OF TAUNTON, MASSACHUSETTS.

IMPROVEMENT IN NUT-TAPPING MACHINES.

Specification forming part of Letters Patent No. 195,321, dated September 18, 1877; application filed June 30, 1877.

*To all whom it may concern:*

Figure 1:
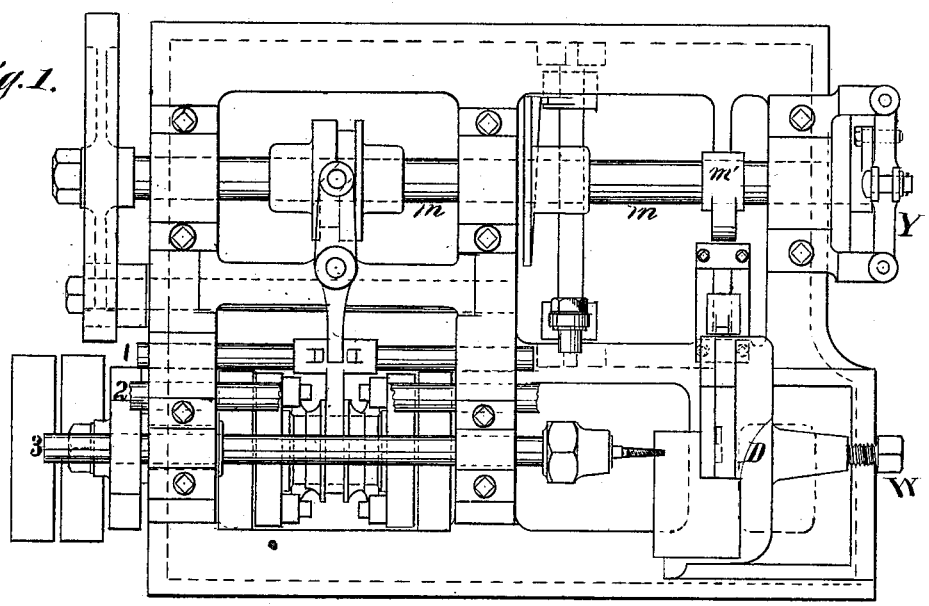
Figure 2:
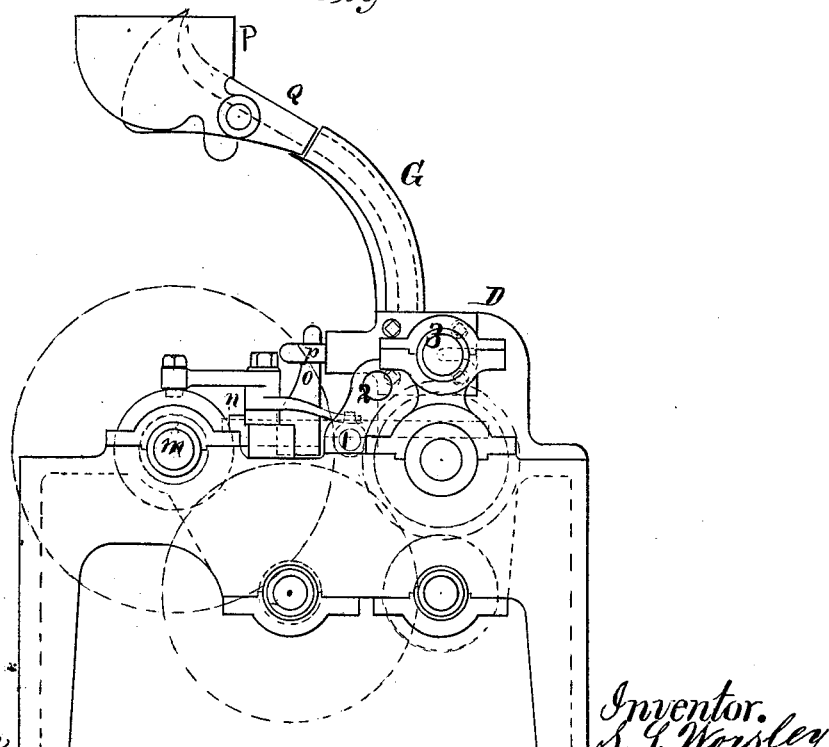

Be it known that I, SAMUEL L. WORSLEY, of Taunton, in the county of Bristol and State of Massachusetts, have invented a new and Improved Nut-Tapping Machine, of which the following is a specification:

Figure 1 is a plan view of my improved nut-tapping machine. Fig. 2 is a side elevation. Fig. 3 is a detail view of a portion of the nut-feeding apparatus. Fig. 4 is a vertical section on line 1 2 in Fig. 3. Fig. 5 is a detail view of the follower. Fig. 6 is a detail view of the crank and slotted follower.

Similar letters of reference indicate corresponding parts.

The invention will first be described in connection with the drawing, and then pointed out in the claim.

In the drawing, A is the frame of the machine, and 3 the mandrel that carries the tap. This mandrel is actuated by substantially the same mechanism as that employed in operating the mandrel of a screw-cutting machine.

In front of the mandrel there is a nut-holder, D, having in it a rectangular mortise of the thickness and width of the nuts to be tapped, which extends horizontally through the holder at right angles with the mandrel. A follower, R, is fitted to the holder D, and is forced by a spring, V, against the nut $s$ in the holder. The said spring abuts upon an adjusting-screw, W.

The nut-blanks are fed to the mortise in the holder through a chute, G, and are carried forward by a follower, $p$. The follower $p$ is engaged by an arm, $o$, attached to the sliding bar $n$. The said bar is moved by a cam, $m'$, on the shaft $m$ at the proper instant to carry the nut in the holder D forward in front of the tap.

The follower R is beveled at $s'$ to allow the nuts to pass it. A hopper, P, is provided, in which an oscillating feeder, Q, is placed, which swings on the shaft N. To this shaft an arm, B, is fixed, which takes motion from a sliding head, Y, which latter is moved by a crank, A', on the end of the shaft $m$. The slot in the head Y is straight from the ends to the points $a$, and between these points it is arc-shaped, the arc being of the same radius as the length of the crank, so that while the crank-pin is passing the arc-shaped portion of the slot at the upper portion of the stroke there is a period of rest.

The feeder Q has in its upper edge a groove, which receives the nut-blanks from the hopper P when the feeder is dropped down, and delivers the blanks to the chute G when the feeder is raised up.

There is a detent or stop spring, S, at the front of the feeder, which retains the nut-blanks until the spring strikes the top of the chute G, when the blanks are permitted to slide into the chute.

The delivery end of the feeder Q is elongated beyond the pivot or shaft N to facilitate the delivery of the blanks to the chute G. When the follower $p$ is drawn back a blank drops from the chute to the mortise in the blank-holder D, and is carried forward by the follower, throwing out the nut already tapped.

The time of the movement of different parts is governed by cams and by change-wheels on the machine, which are proportioned to the different sizes of nuts.

The blank-holder D is provided with the removable portions $u\ f$, which are changed when the holder is adapted to different sizes of nut-blanks. The follower R is bored to receive the end of the tap as it projects through the nut.

In the operation of tapping, the blank is pressed squarely against the plate $f$, so that the tap enters at right angles to the face of the blank, and the nut is in consequence tapped truly.

Having thus described my invention, I claim as new and desire to secure by Letters Patent—

The combination of hollow follower R, the tap passing through it, the blank-holder $u$, and the fixed plate $f$, as and for the purpose specified.

SAMUEL L. WORSLEY.

Witnesses:
ROLLIN WORSLEY,
LAURENS N. FRANCIS.